United States Patent
Reil et al.

[11] Patent Number: 5,977,266
[45] Date of Patent: Nov. 2, 1999

[54] POLYACETAL MOLDINGS WITH DIRECTLY MOLDED-ON FUNCTION ELEMENTS

[75] Inventors: Frank Reil, Gernsheim; Frank Reuter, Grossostheim; Ulrich Haack, Alsbach; Gerhard Reuschel, Biblis, all of Germany

[73] Assignee: Hoechst Aktiengesellschaft, Frankfurt, Germany

[21] Appl. No.: 08/552,427

[22] Filed: Nov. 3, 1995

[30] Foreign Application Priority Data

Nov. 7, 1994 [DE] Germany .............................. 44 39 766

[51] Int. Cl.⁶ .......................... C08L 59/00; B29C 45/16; B29C 47/06
[52] U.S. Cl. .......................... 525/402; 428/500; 428/501; 428/520; 428/524; 525/398; 525/474
[58] Field of Search .................................. 525/398, 402, 525/474; 428/501, 524, 500

[56] References Cited

U.S. PATENT DOCUMENTS

| | | | |
|---|---|---|---|
| 3,674,891 | 7/1972 | Wheeler, Jr. | 260/827 |
| 3,955,697 | 5/1976 | Valyi | 215/1 C |
| 5,039,741 | 8/1991 | Burg et al. | 525/64 |
| 5,047,471 | 9/1991 | Burg et al. | 525/66 |
| 5,098,787 | 3/1992 | Komatsu | 428/343 |
| 5,135,475 | 8/1992 | Nakanishi | 604/14 |
| 5,190,828 | 3/1993 | Katsumata | 428/447 |
| 5,251,953 | 10/1993 | Wiley | 296/152 |
| 5,256,733 | 10/1993 | Fleischer et al. | 525/64 |
| 5,300,338 | 4/1994 | Byrd, Jr. | 428/36.6 |

FOREIGN PATENT DOCUMENTS

| | | | |
|---|---|---|---|
| A-2207806 | 6/1974 | France | B32B 27/00 |
| A-2608501 | 6/1988 | France | B29D 23/00 |
| A-2160146 | 12/1985 | United Kingdom | B29C 45/14 |

OTHER PUBLICATIONS

Database WPI, Week 8923, Derwent Publications Ltd., London, GB; AN 89–169534 & JP–A–01 110 918 (Oshita Sangyo KK), Apr. 27, 1989. (Abstract Only Translation).
Database WPI, Week 8849, Derwent Publications Ltd., London, GB; AN 88–351343 & JP–A–63 264 688 (Asahi Chemical Ind KK), Nov. 1, 1988. (Abstract Only Transation).
Database WPI, Week 8832, Derwent Publications Ltd., London, GB; AN 88–225604 & JP–A–63 162 210 (Hashimoto Forming Kogyo), Jul. 5, 1988. (Abstract Only Translation).
Patent Abstracts of Japan, vol. 13, No. 339 (C–624), Jul. 31, 1989 & JP–A–01 118533 (Asahi Chem Ind Co Ltd), May 11, 1989. (Abstract Only Translation).
Database WPI, Week 8905, Derwent Publications Ltd., London, GB; AN 89–034491 & JP–A–63 306 014 (Asahi Chemical Ind KK), Dec. 14, 1988. (Abstract Only translation).
Patent Abstracts Of Japan, vol. 13, No. 545 (M–902), Dec. 6, 1989 & JP–A–01 225523 (Hitachi Ltd), Sep. 8, 1989. (Abstract Only Translation).
Patent Abstracts Of Japan, vol. 14, No. 107 (M–0942), Feb. 27, 1990 & JP–A–01 310911 (N O K Megurasuteitsuku KK), Dec. 15, 1989. (Abstract Only Translation).
Database WPI, Week 9530, Derwent Publications Ltd., London, GB; AN 95–227893 & JP–A–07 137 089 (Yamashita Denki KK), May 30, 1995. (Abstract Only Translation).

*Primary Examiner*—Fred Zitomer
*Attorney, Agent, or Firm*—Frommer Lawrence & Haug LLP

[57] ABSTRACT

The novel molding made from a combination of polyacetal with directly molded-on function elements is distinguished by the fact that the function elements comprise one or more elastomers. Such elastomers comprise partially or fully hydrogenated nitrile rubbers, one- or multi-component silicone rubbers or sulfur-containing rubbers.

14 Claims, No Drawings

POLYACETAL MOLDINGS WITH DIRECTLY MOLDED-ON FUNCTION ELEMENTS

The invention relates to moldings made from a combination of the engineering material polyacetal, in particular polyoxymethylene, with directly molded-on function elements made from one or more elastomers.

The engineering material polyacetal, in particular polyoxymethylene (POM), has excellent mechanical properties and in addition is also resistant to all customary solvents and fuels. Moldings made from polyoxymethylene are therefore frequently used in fuel-conveying systems. Owing to its very good resistance to chemicals, housings are also made from polyoxymethylene. However, POM has a low mechanical damping factor, which makes the use of flexible damping elements necessary in some applications. Furthermore, a seal is frequently necessary at joints when polyoxymethylene moldings are installed. The high surface hardness of POM moldings and the low coefficient of sliding friction of POM can result in slipping of articles lying on top and restriction of the operating security of switches and controls made from POM.

Hitherto, seals and damping elements have been provided separately and usually anchored mechanically in an additional step, which causes additional work and in some cases considerable additional costs.

The object of the present invention is to provide a polyacetal molding with directly molded-on function elements, in which the adhesion between the molding as such and the function elements is improved without additional adhesive layers or mechanical anchoring being necessary.

This object is achieved by a molding of the above type wherein the directly molded-on function elements comprise elastomers which comprise partially or fully hydrogenated nitrile rubbers, one- or multicomponent silicone rubbers, styrenebutadiene capolymers or sulfur-containing rubbers.

A nitrile rubber which has proven particularly suitable for the purposes of the present invention is acrylonitrile-butadiene copolymer. It was surprising that said rubbers have very good adhesion to the polyoxymethylene of the moldings.

For the purposes of the present invention, the term "function elements" is taken to mean, for example, sealing and/or damping elements or alternatively regions for improving the grip, such as recessed grips and the like.

For the purposes of the present invention, the term "directly molded-on" is taken to mean that the function elements are preferably produced together with the POM moldings to which they are to bond in a one-step process, for example in a multicomponent injection-molding process or by coextrusion.

As a measure of the adhesive strength, the peel strength of two POM sheets with a width of 15 mm bonded by the elastomer is determined. In accordance with the invention, the peel strength between the molding and the directly molded-on function elements is at least 10 N, preferably at least 15 N.

The use of the abovementioned elastomers allows the sealing or damping elements to be molded directly onto POM moldings without further assembly steps being necessary. The elimination of the processing steps required hitherto for assembly of function elements allows considerable cost saving during production of the novel moldings and during their assembly.

Fields of application of the novel moldings are, for example, housings in automobile construction, such as door-lock housings, window-winder housings, sunroof sealing elements and the like, and fixing elements with good damping properties, for example clips or slip-proof controls, such as knobs or recessed grips on pens or switch levers.

We claim:

1. A polyacetal molding, comprising a combination of polyacetal with directly molded-on function elements bonded thereto, wherein the function elements comprise regions which provide sealing, damping and gripping means to the molding, wherein the function elements comprise one or more elastomers selected from the group consisting of partially or fully hydrogenated nitrile rubbers, one- or multicomponent silicone rubbers, sulfur-containing rubbers, acrylonitrile-butadiene copolymers, and styrene-butadiene copolymers, wherein the adhesion between the function elements and the polyacetal is maintained without an of adhesive layers or mechanical anchoring there between.

2. A polyacetal molding according to claim 1, wherein the peel strength between the molding and the directly molded-on function element is at least 10N.

3. A polyacetal molding according to claim 2, which is a door lock housing or window winder housing exhibiting grip and slip-proof properties.

4. A polyacetal molding according to claim 2, which is a clip fixing element exhibiting sealing and damping properties.

5. A polyacetal molding according to claim 2, which is a knob, recessed grip or switch lever exhibiting grip and slip-proof properties.

6. A polyacetal molding according to claim 1, wherein the peel strength between the molding and the directly molded-on function element is at least 15N.

7. A polyacetal molding according to claim 6, which is a door lock housing or window winder housing exhibiting grip and slip-proof properties.

8. A polyacetal molding according to claim 6, which is a clip fixing element exhibiting sealing and damping properties.

9. A polyacetal molding according to claim 6, which is a knob, recessed grip or switch lever exhibiting improved grip and slip-proof properties.

10. A polyacetal molding, comprising a combination of polyacetal with directly molded-on function elements bonded thereto, wherein the function elements comprise regions which provide sealing, damping and gripping means to the molding, wherein the function elements comprise one or more elastomers is acrylonitrile-butadiene copolymers, wherein the adhesion between the function elements and the polyacetal is maintained without an of adhesive layers or mechanical anchoring there between.

11. A polyacetal molding according to claim 10, wherein the peel strength between the molding and the directly molded-on function element is at least 15N.

12. A polyacetal molding according to claim 11, which is a door lock housing or window winder housing exhibiting grip and slip-proof properties.

13. A polyacetal molding according to claim 11, which is a clip fixing element exhibiting sealing and damping properties.

14. A polyacetal molding according to claim 11, which is a knob, recessed grip or switch lever exhibiting grip and slip-proof properties.

* * * * *